United States Patent Office 2,835,601
Patented May 20, 1958

2,835,601

PRODUCTION OF CERAMIC WARE

Karl Turk, Baltimore, Md.; Union Trust Company of Maryland, Margaret McCauley Turk, Richard H. Turk, Herbert Turk, and Karl Turk, Jr., executors of said Karl Turk, deceased, assignors to Pemco Corporation, Baltimore, Md., a corporation of Maryland No Drawing. Application June 24, 1953
Serial No. 363,925

21 Claims. (Cl. 106—48)

The present invention is directed to a new type of decorative ceramic finish and more particularly to a finish wherein a ceramic glaze has dispersed therethrough particles of coloring matter which usually have diffused somewhat in the ceramic glaze to produce a speckled or mottled effect.

Previously it has been only possible to produce a speckled effect in ceramic glazes in which the individual specks remain as specks in the finished fired article and are not diffused to any substantial extent throughout the cooled and solidified glaze.

It has been proposed to introduce into a liquid ceramic glaze particles of nickel oxide which for the most part remain in the ceramic glaze as undiffused particles or specks. This method is used in the production of dinner ware.

A few other minerals as, for example, manganese dioxide, rutile, and oxides of cobalt have also been incorporated in ceramic glazes used as cover coats for dinner ware, wall tiles, and other objects known collectively as art ware as, for example, vases, figurines, and the like.

These coloring materials are usually ground to between 60 and 150 mesh and then incorporated in the glaze before it is applied to an object which is to be decorated. However, these colorants remain in the glaze after the glaze is fired and cooled as substantially individual specks of solid color.

The prior art speckled ware has been substantially limited to blues, browns and blacks, due to the fact that by the prior art procedure the only colorants that could be used were those that produced blue, brown, and black color. In other words, the prior art procedures and products were limited to those materials which occur in such form that they could be held between certain mesh sizes and would retain their shape, size, and substantially their contour in suspension in a glaze. This limited the colorants chiefly to such materials as the oxides of nickel, cobalt, manganese and the like, which retained, between certain predetermined mesh or particle size, their shape in suspension in the glaze, and prevented the use of precipitated pigments and manufactured inorganic colorants.

Therefore, one of the major advantages of the present invention is that finely divided colorants, principally inorganic colorants, can be used for the production of speckled ware, this being made possible by incorporating the precipitated or equivalently produced particles in a conglomerate mass, including an organic thermoplastic carrier and binder, and preferably a flux, as hereinafter more particularly pointed out.

In accordance with one form of the present invention, the colorant material is finely divided and incorporated in a carrier material which is solid at room temperature, that is, temperatures between 60° and 120° F., said carrier being further characterized by the property of being transformed from its solid state to a viscous liquid at temperatures above 120° or 130° F. Into this mixture of finely divided colorant particles and carrier while in a liquid state, there is introduced a flux which functions to act as a matrix for the finely divided colorant particles when the mixture of particles, carrier and flux are cooled so that the composite material assumes a solid state. An additional function of the carrier material is to act as a binder to bind the particles of colorant which are distributed through the flux and further acts in combination with the flux to insure that when the cooled mixture of colorant particles, carrier and binder, and flux are ground into coarse particles, that the coarse particles consist of a plurality of individual particles of bound colorant material distributed through the flux. For example, the particles may be of a size that passes through 60 mesh and are retained on 120 mesh, or pass through 80 mesh and are retained on 120 mesh sieve. The size of the particles is governed by the decorative effects desired and the ability of the suspending ceramic glaze to carry the particles. The limiting size of the particles is determined by the workability of the resultant glaze-conglomerate particle mixture; that is to say, the limits of particle size between which the material can be incorporated in a liquid ceramic glaze and satisfactorily applied to objects which are to be decorated by conventional means such as spraying, brush painting, or dipping. Broadly, the size of the particles is between the limits of those remaining on 150 mesh sieve and those passing through 10 mesh sieve. Various sizes of material between these units can be used. These coarse particles are added to a ceramic coating, such as an underglaze, glaze, or overglaze, before the latter is applied to the object which is to be decorated. Usually the raw ceramic coating is ground by ball milling in a water dispersion until a thin slip is obtained. After the ceramic glaze slip has been prepared, there is mixed therewith the relatively coarse particles of the herein prepared colorant addition product comprising, as stated, a multiplicity of particles distributed through a solid fluxing medium and held in the matrix by a carrier medium which may desirably be any of the materials hereinafter set forth. It is also possible to apply the coarse conglomerate particles to the unfired glaze, said particles being applied by sprinkling or spraying. Thereafter the ware having present the glaze and the applied particles of conglomerate may be fired, and the colorant present in the conglomerate particles is distributed throughout the glaze. After firing, if desired, a clear transparent overglaze may be applied.

The amount of the conglomerate speckling mass which is added to the ceramic coating, which may be a glaze of the character herein set forth, will vary in accordance with the character of the ceramic glaze and the desired decorative coloring effect to be produced upon the object to which the glaze carrying the colorant addition product is to be added. This conglomerate mass functions as a colorant conglomerate addition product which is added to the ceramic glaze in any desired manner, but usually is mixed in with the ceramic glaze by blunging. Usually the amount of the colorant composition which is added to the ceramic coating, which may be an underglaze, glaze, or overglaze, may vary between the limits of about .3 to 15% and preferably between the limits of 1% and 3%, satisfactory results being obtained when about 2% of the conglomerate color addition product, which also contains the material acting as a carrier and binder and the flux component, is added to the ceramic coating or to the ceramic body which it is desired to color. Naturally the amount of the conglomerate speckling or mottling addition product which is added to the ceramic coating slip will depend to a large extent upon the coloring characteristics of the colorant particles which are a component part of the conglomerate composition which is added to the ceramic coating. These percentages are taken on the dry weight of the coating slip.

The term "underglaze" is herein used as commonly understood in the art and signifies any ceramic coating which is applied as an intermediate coating to a fired or unfired ceramic body for purposes of coloration or decoration. In normal ceramic practice, this intermediate underglaze has always applied thereto a cover glaze, which may be any of the cover glazes well known in the ceramic art, including gloss glazes and mat glazes, which are at least translucent and usually are transparent. An example of an underglaze which can be used in carrying out the present invention is a mixture of clay and talc and, of course, there is present for purposes of the present invention, pigmenting or coloring medium.

The term "overglaze" as herein used defines a ceramic coating which is applied over a normal glaze, said ceramic coating having a maturing point ocnsiderably below that of said normal glaze. These overglazes are used for decorative effect and usually are not transparent or materially translucent. It is believed the above definition is in accordance with the meaning given to this term in the ceramic art, and it is the intention to use the term in the present specification in accordance with said meaning.

An example of a suitable overglaze which may be used in carrying out the present invention is 80% to 90% lead borosilicate flux to which is added 10% to 20% of inorganic pigment.

The term "glaze" is herein used in accordance with the definition usually given this term by workers in the ceramic art, and may be defined as a glassy ceramic coating which may be transparent or non-transparent. Examples of suitable glazes will be hereinafter set forth.

After the ceramic coating has had the conglomerate composition incorporated therein, the mixture of the ceramic coating and the conglomerate addition product is applied to the object to be decorated, and the article is fired at a temperature which may vary broadly between 1500° and 2500° F. For example, when high fired dinner ware is fired using a ceramic glaze carrying the conglomerate colorant addition product of the present invention, the firing temperature is preferably between the limits of about 2000° and about 2200° F. For low fired dinner ware, the temperature is between about 1800° F. and about 2000° F. For low fired art ware the firing temperature is preferably between about 1500° and about 1650° F. or between about 1500° and about 1900° F.; and for high fired art ware, the firing temperature is preferably between about 1900°, and about 2100° or 2200° F. For producing coloring effects in wall tile, preferably the firing temperature is between 1850° and 2150° F. The above illustrative examples of the firing temperatures which may be used are set forth by way of illustration and not by way of limitation, as it is obvious that those skilled in the art will use the temperatures most suited for producing the final decorative effect which is the object of the present invention.

The ceramic coating which may be an underglaze, glaze, or overglaze, in admixture with the conglomerate colorant addition composition of the present invention may be applied to any object which it is desired to decorate as, for example, a figurine or ash tray or wall plaque or tile. On firing the flux component of the colorant addition composition, said flux being substantially uniformly distributed through the ceramic coating, begins to melt and fuse as in the case of an overglaze or glaze, at a temperature substantially below the temperature at which the coating begins to melt and fuse, to thereby liberate from the matrix of the colorant conglomerate addition product the colorant particles. The flux of each agglomerant pellet begins to flow prior to the time in the firing cycle when the coating, as, for example, the overglaze or glaze, begins to melt and mature. When the flux begins to flow, the colorant particles are released from the matrix and the color particles undergo a change of form to a larger size. Stated differently, there is a spreading out of the finely divided colorant particles, which is partially responsible for large sized areas of color in the finished article. If the coating does not flow, then the particles stay in a fixed position relative to the glaze in which the particles of colorant material are incorporated. If, on the other hand, the glaze flows, then the particles of coloring material which have an initial flow due to the flux flowing, are further etxended by the flow of the ceramic glaze in the direction of flow to thereby provide streaks of color.

The underglaze does not have any significant flow characteristics. However, when the conglomerate color addition products of the present invention are incorporated in the underglaze and the underglaze applied to the ware, then upon the addition of a glaze to cover the underglaze and the firing of the ware, the particles which are originally present in the underglaze will flow in and into the covering glaze.

*Preparation of conglomerate by mixing a solid binder flux and a colorant in divided state and thereafter heating to convert the binder from a solid to a liquid state, said mixture being cooled and further subdivided*

Instead of incorporating the colorant particles in a liquid carrier as, for example, a resin, wax, or any other of the materials herein set forth, and adding a flux to the mixture, solidifying, and sub-dividing, these constituents may be separately reduced to a finely divided state and then mixed together to produce a composite mixture of colorant particles and binder, and preferably particles of flux. This mixture is then heated to convert the binder from a solid to a liquid state and thereafter the mixture is cooled and the cooled mixture is further subdivided. For example, hydrogenated rosin ester may be reduced in any suitable mill as, for example, a hammer mill or jaw crusher, to a size so that the particles pass through a 20-mesh Tyler screen. This size is merely illustrative and not by way of limitation. It is highly desirable to preliminarily grind the binder component, since if the resin particles in large sizes are mixed with the flux and colorant, and the mixture ground together, the binder and particularly the resin and wax binders generate so much heat of friction as to cause the binder to assume a tacky state, and thereby inhibit the production of a uniform mixture. The flux which may be a vitreous frit is separately ground in any suitable mill as, for example, a ball mill, so that preferably all but 5% of the ground frit passes through a 325 mesh Tyler screen. However, again the size is exemplary and is not set forth by way of limitation. The colorant material which is added to the above-conditioned binder and flux may be in a finely divided state as received from the producer of the material, or it may be in a sintered state, and in that state it is necessary to grind the material so that all but about 1% of the colorant or pigmenting material passes through a 325-mesh sieve. The above prepared constituents are then blended together in a blending machine to produce a substantially homogeneous mixture. The relatively fine particles of flux and the relatively fine particles of color adhere to the relatively coarse particles of the binder.

The so-produced mixture is then further sub-divided by any suitable sub-dividing machine as, for example, a high-speed hammer mill. A micropulverizer may be used.

*Preparation of conglomerate by molding the mixture of binder, flux and colorant under heat and pressure*

In an alternative form of the present invention involving the preparation of the conglomerate pellets, after the materials are finely ground as set forth and prior to the heating of the ground mixture to liquefy the binder, the dry ground mixture may be introduced into a press and the mixture molded under heat and pressure, the heat functioning to liquefy the binder. The mixture is kept in the press under pressure for a sufficient length of time to obtain a uniform diffusion of the binder under heat and pressure throughout the mass. The temperature which is applied to the material in the press is sufficient to cause the binder to flow, said binder being substantially solid at room temperatures of the character herein set forth. As an example of suitable temperatures, it may be stated that the press may be heated to a temperature between 130° and 250° F. Both the lower and upper temperatures of heating in the press will depend upon the specific physical properties of the carrier or binder used in carrying out the present invention. The important point is that the lower press temperature must be sufficient to start the binder to flow under pressure, keeping in mind that the pressure also acts as an agglutinant to cause the flow of the binder, and that the upper press temperature limit must be below the flash point of the binder.

The pressure which is applied to the composite mixture in the press will also vary with the character of the conglomerate mass, the function of the pressure being to diffuse the organic carrier which also functions as a binder through and around the particles of colorant and flux. The pressures may vary broadly between the limits of 200 pounds per square inch and 2500 pounds per square inch, and more specifically between 200 pounds per square inch and about 1500 or between the limits of 200 pounds per square inch and 2,000 pounds per square inch. Satisfactory results may be obtained when the pressure varies between 500 pounds per square inch or 750 pounds per square inch as a lower limit and 1500 pounds per square inch as an upper limit. The upper limit may be increased, as for example, to 2000 or 2500 pounds per square inch.

The amount of carrier and binder that is present in the composite mass in the press will have considerable effect on the temperature and pressure that is needed. However, the above is sufficient to indicate to those skilled in the art how to proceed, the point being to distribute the carrier and binder around the particles of color and flux.

It has been discovered that when the composite mixture is compacted under heat and pressure in the manner above set forth that the amount of carrier-binder used may be materially reduced. For example, when using either of the previous two methods for the preparation of conglomerate mass and the binder present was hydrogenated rosin ester, the amount of the latter used usually varied between the limits of 20 and 30%. However, when the last method set forth is used, said method involving the compacting of the mass under heat and pressure, the amount of hydrogenated rosin ester can be reduced from 20%–30% to as low as 5% and may vary between 5% and 10%, which is a material saving in the amount of rosin ester used.

It is desirable to have as little carrier and binder present in the conglomerate mixture as will effect the desired results. In other words, the conglomerate product is easier to handle when the carrier and binder component is present in fairly low proportions. Most of the carriers and binders when ground fine are difficult to screen, either for the reason that the carrier and binder in finely divided form may become somewhat sticky, or that the carrier and binder in finely divided form has static electrical charges thereon which tend to cause the particles to adhere together and, the less carrier and binder present, the less will be this tendency. It is, therefore, clear that the method of preparing the conglomerate mass where it is treated under heat and pressure offers substantial advantages, including the reduced cost of the carrier and binder.

After the composite conglomerate material is subjected to heat and pressure, it is then removed from the press, preferably slowly cooled to room temperature, and then ground so the particles pass through a 60-mesh Tyler screen and remain on 150-mesh screen, and more broadly, pass through a 10-mesh Tyler screen and remain on 150-mesh screen.

The following are specific examples illustrating preferred procedures and compositions for carrying out the present invention.

EXAMPLE 1

A colorant conglomerate addition product is prepared containing the following ingredients in the proportions set forth, all of said proportions being on the dry weight of said ingredients:

| | Percent |
|---|---|
| Hydrogenated rosin ester (Staybelite resin manufactured by the Hercules Powder Company of Wilmington, Delaware) | 20 |
| Flux | 55 |
| Colorant or glaze stain: chromium oxide | 25 |

In preparing the above composition, the hydrogenated rosin ester is heated to a liquid state. This resin at temperatures between 60° and about 120° F. is stable and brittle so that it may be easily handled. In order to incorporate the colorant particles in a matrix of flux and to agglomerate the colorant particles into larger particles, it is necessary to employ a carrying medium which will function to bind the particles, and this is one of the functions of the hydrogenated rosin ester. The powdered colorant which in this example is chromium oxide, which is green in color, is introduced into the liquid resin and thereafter the inorganic flux is added in finely divided form; or, alternatively, the colorant particles and the finely divided flux may be added simultaneously. The mixture containing the inorganic colorant particles, the liquid resin and the flux is agitated to sufficiently incorporate the colorant and flux into the resin. Thereafter, the mixture is cooled, solidified, and pulverized to provide agglomerate pellets which contain a multiplicity of colorant particles incorporated in the flux and bound together by the carrier which also functions as a binder, said agglomerate addition particles being pulverized so they pass through 60 mesh and remain on 150 mesh, or more broadly, pass through 10 mesh and remain on 150 mesh. These are relatively coarse agglomerate masses or pellets usually of irregular shape. A certain percentage of said pellets is incorporated in a ceramic glaze. The ceramic glaze carrying the particles of colorant addition product is then applied to the ware which it is desired to decorate and the ware fired at a firing temperature which will mature the glaze, the flux maturing below the maturing temperature of the ceramic glaze which carries the incorporated colorant addition product.

The chromic oxide used in the above example is ground to a finely divided state so that 95% passes through a 325 mesh sieve, the opening of 325 mesh sieve being .0017 inch, as set forth in the Handbook of Chemistry and Physics, 31st edition, 1949, page 2669. The table set forth on page 2669 correlates the mesh with the diameter of the particles which pass through the mesh. The fineness of the colorant particles may be varied considerably. However, the colorant particles should be fine enough to agglomerate into a pellet so that later on when the pellet is incorporated in a ceramic glaze, the pellets upon melting will function to distribute the finely divided colorant particles over a larger area than occupied by the pellet to produce large specks of color or elongated streaks of color.

In the above example, the flux comprises the fusion product of 88% lead oxide (PbO litharge) and 12% silicon dioxide. These ingredients are fused or matured at about 1600° F., water-shattered and ground to a finely divided state which may vary, but usually is such as to pass 95% of the flux through 325 mesh screen. In general, the finer the flux, the more successful the mixing of the flux with the colorant particles. In this particular example, the flux has a maturing temperature in the neighborhood of 1600° F. and it was added to a ceramic glaze which had a maturing temperature of 1850° F.

The following are additional examples of the final percentage composition of different fluxes which may be used, together with the temperature at which the flux is prepared and the approximate temperature of fusion of the prepared flux:

TABLE I

*Percentage composition of flux media*

| Flux No.: | | Percent | Temperature of Preparation, °F. | Temperature of Fusion, °F. |
|---|---|---|---|---|
| F-1 | PbO | 72.2 | 1,700-2,000 | 1,040 |
| | ZnO | 5.4 | | |
| | B$_2$O$_3$ | 9.0 | | |
| | SiO$_2$ | 13.4 | | |
| F-2 | Na$_2$O | 10.4 | 1,800-2,200 | 1,420 |
| | CaO | 20.0 | | |
| | B$_2$O$_3$ | 23.3 | | |
| | SiO$_2$ | 46.3 | | |
| F-3 | K$_2$O | 0.7 | 2,000-2,360 | 1,580 |
| | Na$_2$O | 6.5 | | |
| | CaO | 14.1 | | |
| | Al$_2$O$_3$ | 10.0 | | |
| | B$_2$O$_3$ | 14.4 | | |
| | SiO$_2$ | 54.4 | | |
| F-4 | PbO | 61.3 | 2,150-2,250 | 1,525 |
| | Al$_2$O$_3$ | 7.0 | | |
| | SiO$_2$ | 31.7 | | |
| F-5 | Li$_2$O | 1.9 | 1,800-1,900 | 1,150 |
| | K$_2$O | 7.4 | | |
| | Na$_2$O | 2.8 | | |
| | CaO | 0.1 | | |
| | ZnO | 30.2 | | |
| | BaO | 4.4 | | |
| | B$_2$O$_3$ | 22.6 | | |
| | Al$_2$O$_3$ | 4.2 | | |
| | SiO$_2$ | 22.8 | | |
| | TiO$_2$ | 2.1 | | |
| | F | 1.5 | | |

The composition of the flux may be greatly varied using prior art fluxes which have fusion points varying from 960° to 2360° F. or higher.

Glassy ceramic compositions such as the present fluxes melt over a temperature range rather than at a definite point of temperature. The temperatures of fusion set forth in Table I are, of course, the temperatures at which a standard button of the flux will melt and flow when heated at a standard rate.

In the preferred form of the invention, there should be a differential between the maturing ranges of the flux and the ceramic glaze, most satisfactory results having been obtained when there is a temperature differential between the maturing range of the flux and the maturing range of the ceramic glaze, the former being lower than the latter. In general, this temperature differential may be between the limits of 100° and 1200° F. and more narrowly between the limits of 100° and 600° F., good results being obtained when the temperature differential is between the limits of 300° and 400° F.

In general, the inorganic colorants or glaze stains utilized in carrying out the present invention are those generally used and commercially available in the art. Similarly, the glazes and fluxes are materials normally used in the manufacture of glazed ceramic articles. The selection of the proper combinations of fluxes, inorganic colorants, or stains and base glazes depends upon and follows the same general rules necessary for the satisfactory production of colored glazes. These requirements depend upon the composition of the glazes and the colorants and are well known to those skilled in the art.

In general, many binders may be used to bind together the colorant particles or to bind together the colorant particles and the flux particles so there may be produced a colorant addition product of the character herein set forth. The general characteristics of the binder are that it should be relatively hard and brittle at temperatures below 120° or 130° F. and more specifically between about 50° and 120° or 130° F. so that the agglomerate pellets which are finely ground will not stick together during periods of manipulation.

There has been set forth three alternative procedures for the preparation of the agglomerate particles. The first procedure herein designated "A" involves the step of liquefying the binder and mixing it with the colorant and the flux, solidifying the mixture and grinding the same to coarse particles of the character herein set forth.

The second procedure herein designated "B" is directed to finely grinding the carrier-binder, the flux, and the colorant addition product and mixing these ingredients together in a dry state, then heating the mixture, cooling the resulting mass, and grinding the mass to produce agglomerate pellets or particles of the character herein set forth. The second procedure is advantageous in that the equipment necessary for carrying out the process is more simple and that expensive labor involved in mixing the liquid resin with the flux and colorant particles is dispensed with. Moreover it is expensive to liquefy the resin and then effect the mixing of the flux and colorant particles therewith while the resin is in a liquid state. In using procedure B it is absolutely necessary that the carrier-binder be brittle and be characterized by a lack of any substantial tackiness because the particles of the carrier-binder are ground to a fine state.

In the third procedure herein designated "C" a dry mixture is effected as in procedure "B" but the resulting mixture of carrier-binder, colorant and flux is introduced into a press and subjected to heat and pressure treatment to initiate the flow of the carrier which acts as a binder to bind the fine particles of the colorant together and to form a substantially homogeneous composite agglomerate mixture.

It is, therefore, clear that in any of the procedures and especially in procedure C, the carrier-binder initiates its conversion from a solid state to a tacky or liquid state above a temperature of about 120° or 130° F., and in this way facilitates the admixture of the colorant particles and the flux. While the heat employed functions to initiate the conversion from a solid into a tacky or liquid state, that is, softens the carrier-binder, the pressure also functions in a more or less similar way and it is the combined effect of heat and pressure in procedure C which functions to produce the final composite substantially homogeneous composite mass, and, moreover, the mass is produced at a substantial saving since, because of the combined effect of heat and pressure, a smaller amount of carrier-binder is necessary than in procedures A and B. Despite the use of this smaller amount of binder, the agglomerate particles produced by procedure C are just as effective to produce the desired results as are the agglomerate particles produced by procedures A and B. It may be stated that while it is preferred to use procedure C, the agglomerate composite particles of the present invention may also be produced by procedures A and B.

The lower the temperature at which the carrier initiates its conversion from a solid state into a tacky or liquid state, the less the cost of converting the carrier from its solid state into a tacky or liquid state. However, this is subject to the limitation that the carrier must be solid at temperatures below about 120° or 130° F. so that it can be manipulated, and in procedures A and B, ground without sticking together. Further, in all of the procedures outlined, the agglomerate particles as an article of commerce are shipped from the place of manufacture to the place of ultimate use, and it is necessary that these particles remain as substantially individual particles during the period of shipment; that is, that the agglomerate particles do not become tacky and stick together, and this is accomplished by utilizing as a binder one that is stable at room temperatures or slightly above and remains stable at temperatures up to 120° or 130° F.

Inasmuch as the colorant particles and the flux particles are inorganic particles, neither the colorant nor flux will dissolve in the binder, which is an organic compound, such as (a) a natural occurring resin or (b) a synthetic resin. The binder may comprise a resin derivative including hydrogenated rosin or hydrogenated rosin esters, and naturally occurring mineral and vegetable waxes as, for example, Montan wax, petroleum waxes, and synthetic waxes. Further, organic compounds such as the amides of fatty acids, including palmitic, margaric, stearic, and the lower and higher fatty acids, may be used as a carrier which functions as a binder. These saturated fatty acids have the general formula $C_nH_{2n+1}COOH$ and may be used provided they are solid at temperatures below 100° to 130° F. and are solid at temperatures at which the colorant conglomerate particles are blunged into the ceramic glaze, and further have the property of volatilizing at temperatures below that at which the surface of the ceramic glaze begins to fuse over.

The following Table II sets forth examples of binder and carrier components which may be used in carrying out the present invention, it being understood that the invention is not limited to the exact binder and carrier set forth in said table:

TABLE II

*Binder examples*

B-1—Hydrogenated rosin
 (Staybelite resin—Hercules Powder Co., Wilmington, Del.)
B-2—Pentaerythritol ester of hydrogenated rosin
 (Pentalyn H—Hercules Powder Co., Wilmington, Del.)
B-3—Ethylene glycol ester of polymerized rosin
 (Polypal Ester #1—Hercules Powder Co., Wilmington, Del.)
B-4—Glycerol ester of hydrogenated rosin
 (Staybelite Ester #5—Hercules Powder Co., Wilmington, Del.)
B-5—Polymerized rosin ester
 (P. A. D. resin—Hercules Powder Co., Wilmington, Del.)
B-6—Dewaxed solid gum Damar
 (Nudam—Delou, Inc., New York, N. Y.)
B-7—Amide of fatty acids
 (Ceramid—Glyco Products Co., Inc., Brooklyn 2, N. Y.)
B-8—Refined vegetable wax
 (Wax #1001—International Wax Refining Corporation, Valley Stream, N. Y.)

These carriers must be solid and brittle at room temperature. If the carrier is soft or gummy at room temperature, when the colorant particles and flux particles are mixed and the mixture allowed to solidify, said mixture cannot be pulverized to produce the relatively coarse agglomerate masses or pellets which constitute the agglomerate colorant flux addition product which is incorporated in the solid ceramic glaze prior to the application of the glaze to the object to be decorated.

The binder must have the further property that it will be completely destroyed and removed from the applied glaze at temperatures substantially below the maturing or softening temperature of the glaze. In other words, it is necessary that all of the organic material be dispelled from the ceramic glaze before the glaze begins to fuse over the article to which it is applied.

It is clear in view of the above that the chemical composition of the organic binder is not critical so long as the binder meets the physical requirements set forth; that is, that the binder makes possible the production of a product which is essentially solid and friable at temperatures below approximately 120° F., said binder being essentially fluid at temperatures above about 150° and preferably between the limits of 120° or 130° F. as a lower limit and 220° F. as an upper limit to enable ready mixture of the flux and the colorant particles in the binder. Further, it is the physical requirement of the binder that it be completely volatile and pass off from the glaze without leaving residual carbon well below that temperature at which the glaze begins to fuse over. One of the functions of the flux component is to control the size of the color area in the solidified finished coating. For example, if a considerable degree of spreading is desired, the flux which is added is materially lower in fusion characteristics than the glaze to which the colorant pellets are applied. If it is desired to produce a minimum of color spreading and enlargement, the flux may be either reduced in quantity or a more refractory type of flux used as a constituent of the agglomerate particles. Therefore, it is not desired to specifically limit the composition or even the type of the flux ingredient present in the mixture of colorant particles, flux, and carrier which also functions as a binder, it being desired to use the present method of coloring glazes over a wide range of maturing temperatures ranging from 1550° F. or lower, to 2350° F. or thereabouts, or in the terminology of the ceramic industry, between the limits of cone 012 or lower, to cone 12.

The following is an additional example utilizing procedure B for the preparation of the agglomerate pellets:

EXAMPLE 2

A colorant addition product is prepared containing the following ingredients in the proportions set forth, all of said proportions being on the total weight of the agglomerate addition product:

| | Percent |
|---|---|
| Ethylene glycol ester of polymerized rosin (Polypal resin manufactured by Hercules Powder Co., Wilmington, Del.) | 20 |
| Flux | 70 |
| Colorant or glaze stain: Calcined addition product of cobalt oxide and alumina | 10 |

In preparing the composition, the rosin ester is pulverized so that all of the particles pass through a 4-mesh Tyler screen. The resin at room temperature is stable and brittle so it may be easily handled. The flux component used to produce the agglomerate mixture is milled so that 95% of the flux passes through a 325-mesh Tyler screen and not more than 5% is retained on the screen. Preferably in order to reduce the flux particles to a fineness of the character set forth, the flux is run through a ball mill. Functionally, the flux particles are finely divided so that when the relatively coarse particles of carrier-binder are mixed with the flux particles and the color particles and further ground, the flux particles form a coating on the carrier-binder particles and in this manner inhibit the carrier-binder particles from sticking together and sticking to the apparatus in which they are ground. Therefore, from a functional standpoint, the present method of preparing the agglomerate composition is not limited to grinding the flux to the fineness indicated. The flux should be ground to that degree so it is fine enough to furnish a coating on the agglomerate particles.

The colorant or glaze stain may be ground if it is not already ground when received from the manufacturer. For example, it may be ground to approximately the same fineness as the flux. When the carrier which also functions as a binder, flux and stain are mixed together, there should be a more or less uniform distribution of the relatively coarse particles of the carrier-binder in the relatively fine particles of flux and colorant.

The above set forth constituents are then blended in a suitable blending apparatus as, for example, in a ribbon blender, and the blended mixture is thereafter pulverized by passage of the same through a high-speed hammer mill, now known in the art as a micro-pulverizer. The function of the micro-pulverizer is to break up or pulverize the relatively coarse particles of the carrier-binder. In the preferred form of carrying out the present method of preparation, the mixture of ingredients is treated in the micro-pulverizer until the relatively coarse particles of the carrier-binder are reduced to a finely divided condition which may desirably approach the fineness of the flux and the color ingredients. There is thereby produced in powdered form a homogeneous mixture of the carrier-binder, the flux, and the colorant. It is not necessary that these particles be all of the same size, but it is desirable that they all be in finely divided condition and that a substantially homogeneous finely divided mixture is produced.

The above substantially homogeneous mixture is then heated to liquefy the carrier-binder. When the carrier-binder becomes liquid, the liquid binder coats the particles of flux and colorant. During the heating step, sufficient heat must be generated to liquefy the resin throughout its entire mass. In general, the mass may be heated between the temperature limits of 200° and 250° F. Obviously, the temperature to which the mass is heated will depend upon the characteristics of the ingredients being heated, including the particular physical and chemical characteristics of the carrier-binder. Some binders will function satisfactorily as low as 150° F. and other binders are of such character that it is desirable to heat to 200° or 250° F. In this particular example the homogeneous mixture was heat-treated to 250° in relatively shallow layers so that the heat could quickly penetrate into the interior of the mass, and thereby accelerate the action of the binder in liquefying and encasing the particles of flux and colorant. Obviously, this is merely a preferred method of accomplishing the encasing action, and it is not necessary to provide shallow layers. The liquefaction of the binder and encasing of the flux and colorant particles may be effected by any means well known in the art to produce this result.

Thereafter, the resulting mass containing particles of flux and particles of colorant encased in a binder are pulverized to produce particles which pass through 60 mesh and remain on 150 mesh, or more broadly pass through 40 mesh and remain on 150 mesh. These particles are relatively coarse agglomerate masses or pellets usually of irregular shape. The size of the pellets that it is preferably desired to incorporate in the ceramic coatings in accordance with the present invention should not be finer than above set forth. In producing these agglomerate particles, it is desirable to substantially remove therefrom particles finer than above set forth. If these particles are not removed, when the pellets are incorporated in the glaze there is a tendency to produce a cloudy effect which is often undesirable. Of course, there are some decorative effects in which it may be desirable to allow some of the fine particles to remain with the coarsely ground agglomerate pellets.

The following is a further example illustrating procedure C wherein the ground homogeneous mixture of carrier-binder, flux, and colorant is subjected to heat-treatment under pressure to accelerate the flow of the binder:

EXAMPLE 3

A colorant addition product is prepared containing the following ingredients in the proportions set forth, all of said proportions being on the total weight of the dry mixture of said ingredients:

| | Percent |
|---|---|
| Hydrogenated rosin ester (Staybelite Resin manufactured by the Hercules Powder Co. of Wilmington) | 8 |
| Flux | 82 |
| Colorant or glaze stain: cobalt chrome blue-green | 10 |

These ingredients are compounded in accordance with procedure B up to the stage where a homogeneous finely divided mixture of the carrier-binder, flux, and colorant is produced. However, instead of heating the mixture as above described, the composite mixture carrying the specified ingredients is introduced into the mold cavity of a hydraulic press, said mold cavity being preferably internally heated. One method of effecting the heat and pressure treatment in the press is to preconsolidate the ingredients of the dry mixture by a first-stage heating step sufficient to liquefy the binder, the contents of the mold being under light pressure as, for example 200 to 500 pounds per square inch. The pressure limits are not of importance. The main consideration is to preliminarily consolidate the mixture under a low heat and low pressure, the heating being desirably between the limits of 140° or 150° and 175° or 200° F. The mass is maintained in the mold cavity under the temperature and pressure conditions specified until the entire mass is substantially uniformly heated. The time period obviously will depend upon the physical and chemical characteristics of the material being treated, and the first-stage heating and pressure conditions.

After the preliminary consolidation is effected, the second-stage treatment is effected, the function of the second-stage treatment being to complete the diffusion of the carrier-binder throughout the mass and around the particles of flux and colorant, this being aided by the second-stage pressure treatment which is preferably between 1,000 and 2,000 pounds per square inch. Obviously, the magnitude of the pressure treatment in the second-stage operation may be greatly varied so long as the final consolidation of the material is effected.

Instead of carrying out this procedure C in two stages, the material may be introduced into the press and agglomerated into a consolidated mass by a single-stage heat treatment, using temperatures ni the neighborhood of 200° to 250° and pressures between limits of 1,000 and 2,000 pounds per square inch. The upper pressure limit may be 2500 pounds per square inch.

The so-produced mass is then ground to the condition of coarse particles. The ground particles preferably pass through 60-mesh screen and remain on 150-mesh, or more broadly, pass through 10-mesh screen and remain on 150-mesh screen.

Each one of the produced pellets carries a charge of coloring material, the particles of which are bound together by the binder and a flux having a maturing temperature substantially below the maturing temperature of any ceramic coating or glaze in which the pellets are incorporated.

The following Table III sets forth formulas and percentage composition of glazes which may be used in carrying out the present invention:

TABLE III

*Formulas and percentage composition of glaze frits*

| Frit | K₂O | Na₂O | CaO | MgO | BaO | ZnO | PbO | Al₂O₃ | B₂O₃ | SiO₂ | ZrO₂ |
|------|-----|------|------|-----|-----|------|------|-------|------|------|------|
| #1 | ---- | 3.6 | 4.5 | ---- | ---- | ---- | 31.0 | 3.4 | 13.1 | 43.5 | 1.0 |
| #2 | 2.4 | 4.0 | 5.9 | ---- | ---- | 9.5 | 11.3 | 7.4 | 6.5 | 53.0 | ---- |
| #3 | 2.7 | 1.8 | 10.4 | ---- | ---- | ---- | 17.1 | 6.2 | 8.0 | 53.8 | ---- |
| #4 | 4.0 | 1.6 | 14.3 | 0.6 | 4.1 | 13.4 | ---- | 8.2 | 4.5 | 49.3 | ---- |
| #5 | 2.8 | 1.5 | 15.6 | 1.0 | 3.7 | 18.2 | ---- | 6.8 | ---- | 46.0 | 4.4 |

COVER GLAZE FORMULATIONS

|  |  | Percent |
|---|---|---|
| G-1 | Frit #1 | 92 |
|     | Kaolin | 8 |
|     |        | 100 |
| G-2 | Frit #2 | 92 |
|     | Kaolin | 8 |
|     |        | 100 |
| G-3 | Frit #3 | 90 |
|     | Kaolin | 10 |
|     |        | 100 |
| G-4 | Frit #4 | 62.8 |
|     | Feldspar | 12.5 |
|     | Zinc oxide | 3.1 |
|     | Kaolin | 11.2 |
|     | Flint | 10.3 |
|     |        | 99.9 |
| G-5 | Frit #5 | 54 |
|     | Feldspar | 20 |
|     | Kaolin | 9 |
|     | Flint | 17 |
|     |        | 100 |
| G-6 | Frit #1 | 46 |
|     | Frit #3 | 46 |
|     | Kaolin | 8 |
|     |        | 100 |
| G-7 | Feldspar | 43.3 |
|     | Whiting | 18.5 |
|     | Flint | 25.8 |
|     | Kaolin | 10.3 |
|     | Borax | 2.1 |
|     |        | 100.0 |

The following Table IV sets forth examples of colorant compounds which may be used in carrying out the present invention, said colorant compounds being commercially known under the name of glaze stains:

TABLE IV

*Colorant compounds*

(COMMERCIAL GLAZE STAINS)

C-1—Chrome-Oxide Green
C-2—Cobalt-Chrome Blue Green
C-3—Cobalt-Alumina Blue
C-4—Chrome-Zinc-Alumina Pink The following Table V sets forth data for 19 different runs in which the conglomerate coloring pellets were embodied in commercial glazes and said glazes applied to ceramic ware to produce a finished fired product or article having a novel decorative effect:

TABLE V

*Production of fired articles*

GROUP I.—CONE 06 (APPROXIMATELY 1,841° F.-1,859° F.)

| Glaze No. | Conglomerate Coloring Composition | Parts of mixture of Glaze and Conglomerate Coloring Composition | Conglomerate coloring composition, Parts by weight |
|---|---|---|---|
| (a) G-1 | PR-93 | 100 / 2 | PR-93: F-1 70, C-1 10, B-1 25 |
| (b) G-1 | PR-98 | 100 / 2 | PR-98: F-1 70, C-1 10, B-2 30 |
| (c) G-1 | PR-99 | 100 / 2 | PR-99: F-1 70, C-1 10, B-3 30 |
| (d) G-1 | PR-100 | 100 / 2 | PR-100: F-1 70, C-1 10, B-4 25 |
| (e) G-1 | PR-101 | 100 / 2 | PR-101: F-1 70, C-1 10, B-5 35 |
| (f) G-1 | PR-102 | 100 / 2 | PR-102: F-1 70, C-1 10, B-6 35 |
| (g) G-1 | PR-103 | 100 / 2 | PR-103: F-1 70, C-1 10, B-7 25 |
| (h) G-1 | PR-105 | 100 / 2 | PR-105: F-1 70, C-1 10, B-8 15 |

GROUP II.—CONE 03 (APPROXIMATELY 1,976° F.–2,039° F.)

| | | | PR-121 | |
|---|---|---|---|---|
| (i) G-2 | PR-121 | 100 | F-5 | 70 |
| | | 5 | C-4 | 5 |
| | | | B-1 | 25 |

GROUP III.—CONE 4 (APPROXIMATELY 2,129° F.–2,174° F.)

| | | | | |
|---|---|---|---|---|
| (j) G-3 | PR-95 | 100 | PR-95 F-2 | 70 |
| | | 2 | C-2 | 10 |
| | | | B-1 | 25 |
| (k) G-3 | PR-108 | 100 | PR-108 F-2 | 70 |
| | | 2 | C-2 | 10 |
| | | | B-2 | 30 |
| (l) G-3 | PR-109 | 100 | PR-109 F-2 | 70 |
| | | 2 | C-2 | 10 |
| | | | B-3 | 30 |
| (m) G-3 | PR-110 | 100 | PR-110 F-2 | 70 |
| | | 2 | C-2 | 10 |
| | | | B-4 | 25 |
| (n) G-3 | PR-111 | 110 | PR-111 F-2 | 70 |
| | | 2 | C-2 | 10 |
| | | | B-5 | 35 |
| (o) G-3 | PR-112 | 100 | PR-112 F-2 | 70 |
| | | 2 | C-2 | 10 |
| | | | B-6 | 36 |
| (p) G-3 | PR-113 | 100 | PR-113 F-2 | 70 |
| | | 2 | C-2 | 10 |
| | | | B-7 | 25 |
| (q) G-3 | PR-115 | 100 | PR-115 F-2 | 70 |
| | | 2 | C-2 | 10 |
| | | | B-8 | 15 |

GROUP IV.—CONE 6 (APPROXIMATELY 2,174° F.–2,246° F.)

| | | | PR-119 | |
|---|---|---|---|---|
| (r) G-4 | PR-119 | 100 | F-4 | 70 |
| | | 2 | C-3 | 10 |
| | | | B-1 | 25 |

GROUP V.—CONE 11 (APPROXIMATELY 2,345° F.–2,417° F.)

| | | | PR-123 | |
|---|---|---|---|---|
| (s) G-5 | PR-123 | 100 | F-3 | 70 |
| | | 2 | C-1 | 10 |
| | | | B-1 | 25 |

Referring to the above table, the first two columns show the composition of the mixtures of glazes and prepared conglomerate colorant composition. For example, in the group I experiments, the batch for experiment (a) consisted of 100 pounds of glaze G-1 to which there were added 2 pounds of the composite conglomerate speckling or mottling composition prepared according to the formulation shown under the heading "Conglomerate coloring composition." In the case of the experiment (a) PR-93 consisted of 70 parts of flux F-1, 10 parts of color C-1, and 25 parts of binder B-1. In these examples the conglomerate masses or pellets were ground to such a fineness that they passed through a 100 mesh Tyler standard sieve and were held on a 150-mesh sieve. The table shows data for runs carried out at five different maturing temperatures; that is, cones 06, 03, 4, 6 and 11. The temperature of firing is not critical, but may be varied according to the physical and chemical characteristics of the components used. Probably the major use of the present invention will be at cone 06 which represents the temperature widely used in the art pottery field, and at or around cone 4 which represents roughly the temperature widely used in the manufacture of dinner ware and many other items.

The runs, the data of which are set forth in Table V, were carried out using 2% of the conglomerate coloring composition with the exception of (i) where 5% is used. This is due to the fact that C-4 is not as strong a stain as the other colorants noted and, therefore, requires a higher percentage of the conglomerate coloring composition to be present in the ceramic glaze. In each example the amount of binder added was just sufficient to wet the remainder of the conglomerated pellet composition and bind it together.

It is noted that the amount of binder varied with the type of the binder. Thus, when using binders B-5 and B-6 shown in Table II, there are required 35 parts of binder to 80 parts of flux and color, while binder #8 requires only 15 parts of binder.

When it is desired to produce a fine speckled effect with a minimum of color spreading or area of color enlargement in the finally glazed article, the flux component may be substantially reduced. Ordinarily, when it is desired to effect a color spreading in the finally glazed article, the flux component in the conglomerate coloring addition composition may be broadly between 5% and 75% and more narrowly between 30 and 75%. Very satisfactory results have been obtained when the percentage of flux in the conglomerate coloring addition composition varies between 50% and 70%, all of said percentages being taken on the weight of the flux-binder-and-carrier-colorant mixture. In some cases the flux may be entirely omitted.

The amount of colorant in the flux addition product may vary broadly between the limits of 1½% and 75% or 80% depending on the potency of the coloring stain. More narrowly, the limits may be between 10% and 75%. Satisfactory results have been obtained when the color component of the conglomerate mixture of binder, flux and colorant is between the limits of 20% and 30% taken on the weight of the conglomerate composition. Good results have been obtained with about 10%, or a little less, as set forth in Table V.

The carrier-binder may be present in the binder-flux-colorant composition broadly between the limits of 5% and 40%, and more narrowly between the limits of 10% and 40%. Satisfactory results have been obtained when the carrier-binder component as, for example, the hydrogenated rosin ester, is present in the conglomerate coloring composition in an amount of about 25% taken on the weight of the binder, flux, and colorant composition, but may be as low as 5%, and this is particularly true when preparing the conglomerate addition product by method C herein previously set forth.

The conglomerate pellets of the present invention may be incorporated in an underglaze coating, and this term is used in its usual significance in the ceramic art. Examples of suitable underglaze coatings are set forth in the following table:

TABLE VI

*Percentage composition by weight of underglaze coating*

| | U-1 | U-2 | U-3 |
|---|---|---|---|
| Talc | 40.0 | 20.0 | |
| Plastic Vitrox Clay | 12.0 | | |
| Ball Clay | 28.0 | 20.0 | |
| Kaolin | | | 10.0 |
| Flint | | 5.0 | |
| Flux F-3 | | 5.0 | |
| Flux F-2 | | | 10.0 |
| Colorant C-5 | 20.0 | 50.0 | 80.0 |

The plastic Vitrox clay comprises silica 78.40%, alumina 12.80%, lime .28%, potash 5.40%, soda 1.95%, and miscellaneous 1.17%.

In utilizing the underglaze coatings above set forth in accordance with the present invention, the underglaze coating is milled with a suspension agent, such as water, and into the milled aqueous suspension of the undercoating there is introduced the conglomerate pellets of the present invention in the proportions previously set forth. The underglaze coating carrying the dispersed pellets may be applied to an unfired green ceramic body as, for example, a vase, tile, dinnerware, or the like, and the so-treated ceramic ware may be fired to mature the body and the underglaze. The binder component of the pellets at the firing temperature is dispersed or volatilized, releasing therefrom the flux and the color components. The flux binds the color component to the underglaze which is vitrified. In other words, it is well known that the underglaze is a sintered mass and it is this sintered mass which holds the released color specks which remain substantially in their original area of deposition. There is then applied to the fired article carrying the deposited color and flux ingredients a ceramic cover glaze of any suitable character as, for example, the herein set forth cover glazes identified as G–1 to G–7. The article is again fired at a suitable firing temperature to mature the glaze as, for example, between 1500 and 2500° F. During the period of firing the flux which has been deposited from the conglomerate particles which were present in the underglaze matures at a temperature substantially below the temperature of the cover glaze, and as this flux matures, it flows and diffuses into the glaze carrying the color with it. The so-treated article is then allowed to cool.

In carrying out the above, one firing step may be used instead of two firing steps; that is, after the application of the underglaze to the green ceramic piece before the latter is fired there may be applied a cover coat glaze and then the green ceramic article is fired, said cover coat glaze being at least translucent and preferably transparent. Preferably the colorant of the applied conglomerate particle is different from the color of the underglaze so that desirably, although not necessarily, there is a distinct contrast in color.

There has been provided in accordance with the present invention a conglomerate coloring composition and a method of producing a speckling or mottling in a fired ceramic glaze whereby the specks or mottling may be produced in any color obtainable with commercial glaze stains or colorants and in which the size of the speck or the mottling or the degree of diffusion may be controlled. This result is obtained in one form of the invention by the incorporation of any commercial stain or colorant in a suitable amount either alone or together with a flux component in an organic binder of the thermoplastic type which must have the property of being suitably fluid at a reasonably low temperature to make possible the ready admixture of the color and/or flux and which will solidify at room temperature to a solid mass which may be readily broken down into particles of controllable size, following which said composite particles may be admixed with the milled liquid glaze and applied to the ware to be fired without the loss of the normal size or shape of the color particles or with a controlled sizing effect due to the flow of the color particles. In one form of the invention a method is provided of producing ceramic ware having a decorative fired ceramic glaze or equivalent ceramic coating comprising mixing color particles with a liquid organic binder and carrier for said color particles, said binder and carrier being hard and friable after being cooled and during the admixing or blunging of the resulting color conglomerate with a glaze. The color particles are also mixed with an inorganic flux having a fluxing temperature lower than the maturing and firing temperatures of the ceramic glaze in which the color particles are to be incorporated, said flux acting to control the degree of diffusion of the color particles when the ceramic glaze carrying said color particles is fired. After admixture of the liquid binder with the color particles and flux, the mass is cooled and solidified and the resulting conglomerate coloring addition composition is reduced to a divided state comprising color particles encased in the flux and carrier mixture forming a matrix for the color particles. The reduced conglomerate addition product is then blunged into a ceramic glaze while maintaining said conglomerate particles in a solid state. Thereafter, the admixture of the glaze and conglomerate addition product is applied to the ware base which may be a ceramic base, a metal base, or any base which is stable and incapable of being consumed at the firing temperature and which will not buckle at the firing temperature. Upon firing, the ceramic glaze, the binder volatilizes, leaving substantially no carbon residue.

In general, it may be stated that in one form of the present invention; that is, in procedure A, the binder is heated until it is sufficiently fluid, whereupon the colorant particles and the flux are added. Normally, the colorant particles at this stage will be extremely fine, and will pass a 200 mesh or 300 mesh, or even a 325 mesh sieve. The flux is also ground to a very fine state, so that the admixture can be properly made. The powdered colorant and the powdered flux are then added to the binder and bound together. Usually, the colored particles and the flux are bound together by the organic binder. It is possible to carry out the present invention without using the flux, although in such a case the conglomerate particles should be on the coarse side, since the particles do not change in shape on firing. An example of such a mixture maturing in the cone 06 group is 70 parts of C–1 colorant admixed with 30 parts of B–2 binder. It is desired to point out that the decorative effects obtained by the present invention may be varied rather widely by those skilled in the art through control of the particle size of the conglomerate color and also by means of the amount of the color added to the liquid glaze. For example, in the decoration of flat tile and similar objects wherein the surface of the object is maintained in a horizontal plane so that the flow of the colorant in the glaze is more or less uniform outward from the particle, a somewhat larger particle size may be desirable than is the case with objects in which a considerable portion of the surface area lies in a vertical plane. With the aforementioned flat objects decorated in a horizontal plane, it has been found that colorant particles retained on a 60 mesh to 80 mesh sieve and passing through a 20 mesh, or even a 10 mesh, sieve, in many cases provides a superior decoration than is the case when finer particle sizes as, for example, those retained on a 120 mesh or 150 mesh sieve and passing through a 60 mesh sieve, are used. Although usually the amount of conglomerate color addition product added to the liquid ceramic glaze will vary between the limits of about 0.3 and 5%, here again the final percentage of colorant used will depend on the decorative effect desired. For example, it has been found that the addition of 15% of colorant, which had been compounded in accordance with the invention using a light brown-type stain, produced when admixed with a liquid glaze and applied to a figurine a very superior simulation of the color and texture of human hair, said simulation of human hair not being obtainable in any other way.

The ceramic composition for application to a base material by a fusion step may comprise a ceramic glaze having mixed therein about 0.3% to about 5% of the herein disclosed conglomerate mass, said percentage being taken on the weight of the conglomerate mass.

In the specification the carrier material also functions as a binder and, therefore, it is submitted that it is proper to designate this material as a carrier-binder material or as a carrier and binder.

The present application is a continuation-in-part of the abandoned application Serial No. 299,259, filed July 16, 1952.

What is claimed is:

1. The method of producing ceramic ware provided with a decorative fired ceramic glaze comprising forming a mixture of finely divided pigment particles, finely divided inorganic flux, and an organic thermoplastic binder, said pigment particles and flux being substantially insoluble in said binder, said flux having a fluxing temperature lower than the maturing and firing temperature of said ceramic glaze, said thermoplastic binder being a solid at a temperature below 150° F. and having the property of being transformed into a viscous liquid on heating, converting said mixture into solid coarse composite conglomerate particles wherein a multiplicity of pigment particles are distributed through and held in said composite particles by the solid binder, mixing a small amount of the composite conglomerate particles with a ceramic glaze of a predetermined appearance while maintaining said conglomerate particles in a solid state, applying the resulting mixture to the ware and firing said mixture at the maturing temperature of the ceramic glaze, said composite conglomerate particles being converted from a solid to a liquid state at a temperature below the maturing temperature of the glaze to thereby release the finely divided pigment particles, the latter contrasting in appearance with the predetermined appearance of the fired glaze, said binder volatilizing with substantially no residue at a temperature below that at which the surface of the ceramic glaze begins to fuse over.

2. The method defined in claim 1 in which the ware is fired at a temperature between about 1500° and about 2500° F.

3. The method of producing ceramic ware as defined in claim 1 in which the organic thermoplastic binder is a resin.

4. The method of producing ceramic ware as defined in claim 1 in which the organic thermoplastic binder is a wax.

5. The method of producing ceramic ware as defined in claim 1 in which the binder is present in the conglomerate particles in an amount between about 5% and about 40% taken on the weight of the conglomerate particles.

6. The method of producing ceramic ware as defined in claim 1 in which the ceramic glaze has mixed therewith between about 0.3% and about 15% of the conglomerate particles taken on the weight of the ceramic glaze.

7. The method of producing ceramic ware as defined in claim 1 in which the ceramic glaze has mixed therewith between about 0.3% and about 15% of the conglomerate particles taken on the weight of the ceramic glaze, and the percentage of binder in the conglomerate particles is between the limits of about 5% and about 40% taken on the weight of the conglomerate particles.

8. The method of producing ceramic ware provided with a decorative fired ceramic glaze comprising forming a solid conglomerate mixture of pigment particles, flux particles, and particles of an organic thermoplastic binder, said flux having a fluxing temperature lower than the maturing and firing temperature of the said ceramic glaze, the flux acting to control the degree of diffusion of the pigment particles when the ceramic glaze carrying said pigment particles is fired, said pigment particles and flux being substantially insoluble in said binder, reducing the conglomerate mass to a divided state comprising pigment distributed through conglomerate particles, mixing a small amount of the latter with a ceramic glaze of a predetermined appearance while maintaining said particles in a solid state, applying the mixture of said particles and glaze to the ware, firing the ceramic glaze containing conglomerate particles comprising a mixture of pigment, flux and binder while heat-flowing the flux of the conglomerate particles prior to the time the ceramic glaze begins to mature and, during said flow of the flux, releasing the pigment from said conglomerate particles in relatively large areas contrasting with the predetermined appearance of the fired glaze, said binder volatilizing with substantially no residue at a temperature below that at which the surface of the ceramic glaze begins to fuse over.

9. The method of producing ceramic ware provided with a decorative fired ceramic glaze comprising forming a solid conglomerate mixture of pigment particles, flux particles, and particles of an organic thermoplastic binder, said flux having a fluxing temperature lower than the maturing and firing temperature of said ceramic glaze, the flux acting to control the degree of diffusion of the pigment particles when the ceramic glaze carrying said pigment particles is fired, said pigment particles and flux being substantially insoluble in said binder, reducing the conglomerate mass to a divided state comprising pigment distributed through conglomerate particles, mixing a small amount of the latter with a ceramic glaze of a predetermined appearance while maintaining said particles in a solid state, applying the mixture of said particles and glaze to the ware, firing and heating the ceramic glaze containing conglomerate particles comprising a mixture of pigment, flux and binder and substantially inhibiting flow of the glaze during its period of firing and heating while heat-flowing the flux of the conglomerate particles and maintaining the released pigment substantially stationary, the appearance of the latter contrasting with the appearance of the fired glaze, said binder volatilizing with substantially no residue at a temperature below that at which the surface of the ceramic glaze begins to fuse over.

10. A ceramic composition for application by fusion thereof to a base material, comprising a ceramic glaze having incorporated therein a conglomerate mass comprising solid coarse composite conglomerate particles, the latter consisting essentially of a finely divided inorganic flux having a fluxing temperature lower than the maturing and firing temperature of said ceramic glaze, a multiplicity of finely divided pigment particles for imparting an appearance contrasting with the appearance of the glaze in its fired state, said pigment particles being distributed and held in said coarse composite conglomerate particles by an organic thermoplastic binder solid at a temperature below 150° F. and at the temperature of initial incorporation of said composite conglomerate particles in the unfired glaze, said binder having the property of being transformed into a viscous liquid on heating to thereby release said pigment particles, and of volatilizing from the ceramic glaze at a temperature below the softening temperature of the glaze, said pigment particles being substantially insoluble in said binder.

11. The ceramic composition defined in claim 10 in which the binder of the solid coarse composite conglomerate particles is present in an amount between the limits of about 5% and about 40% taken on the weight of the conglomerate mass.

12. The ceramic composition defined in claim 10 in which the binder of the solid coarse composite conglomerate particles is present in an amount between the limits of about 5% and about 15% taken on the weight of the conglomerate mass.

13. The ceramic composition defined in claim 10 in which the ceramic glaze has incorporated therein about 0.3% to about 15% of the solid composite conglomerate particles, said percentages being taken on the weight of the ceramic glaze.

14. The ceramic composition defined in claim 10 in which the binder is a thermoplastic resin.

15. The ceramic composition defined in claim 10 in which the thermoplastic binder is a wax.

16. The method of producing a decorative conglomerate material adapted to be mixed with a ceramic glaze comprising forming a mixture of finely divided pigment particles, finely divided inorganic flux, and an organic thermoplastic binder, said pigment particles and flux being substantially insoluble in said binder, said flux having a fluxing temperature lower than the maturing and firing temperature of said ceramic glaze, said mixture being maintained in a solid state, molding said mixture under heat and pressure until the binder begins to flow and there is a uniform diffusion of the binder throughout the resulting composite mass and around the finely divided particles of pigment and flux, the temperature of the composite mass being maintained during molding below the flash point of said thermoplastic binder, cooling the resulting mass and converting the same into coarse particles carrying a charge of finely divided colorant.

17. The method of producing a ceramic glaze composition comprising a ceramic glaze having incorporated therein solid coarse composite conglomerate particles comprising forming a mixture of finely divided pigment particles, finely divided inorganic flux, and an organic thermoplastic binder, said pigment particles and flux being substantially insoluble in said binder, said flux having a fluxing temperature lower than the maturing and firing temperature of said ceramic glaze, said mixture being maintained in a solid state, molding said mixture under heat and pressure until the binder begins to flow and there is a uniform diffusion of the binder throughout the resulting composite mass and around the finely divided particles of pigment and flux, the temperature of the composite mass being maintained during molding below the flash point of said thermoplastic binder, cooling the resulting mass, converting the same into coarse particles, and incorporating the resulting composite conglomerate particles in said ceramic glaze.

18. The method of producing ceramic ware provided with a decorative fired ceramic glaze comprising mixing (a) finely divided pigment particles, (b) finely divided inorganic flux having a fluxing temperature lower than the maturing and firing temperature of a ceramic glaze in which the pigment particles are to be incorporated, said flux acting to control the diffusion of the pigment particles when the ceramic glaze carrying said pigment particles is fired, and (c) a liquid organic thermoplastic binder in which the pigment particles and the flux particles are substantially insoluble, cooling and converting the resulting mixture into solid coarse composite conglomerate particles wherein a multiplicity of pigment particles are distributed through and held in said composite particles by the solid binder, mixing a small amount of the composite conglomerate particles with a ceramic glaze of a predetermined appearance while maintaining said conglomerate particles in a solid state, applying the resulting mixture to the ware, and firing said mixture of glaze and conglomerate particles at the maturing temperature of the ceramic glaze, said composite conglomerate particles being converted from a solid to a liquid state at a temperature below the maturing temperature of the glaze to thereby release the finely divided pigment particles, the latter contrasting in appearance with the predetermined appearance of the fired glaze, said binder volatilizing with substantially no residue at a temperature below that at which the surface of the ceramic glaze begins to fuse over.

19. The method of producing ceramic ware provided with a decorative fired ceramic glaze comprising forming solid coarse composite conglomerate particles the latter consisting essentially of a finely divided inorganic flux having a fluxing temperature lower than the maturing and firing temperature of said ceramic glaze, a multiplicity of finely divided pigment particles and a liquid organic thermoplastic binder solid at a temperature below 150° F. in which the pigment particles and flux particles are substantially insoluble in said binder, said pigment particles being distributed through and held in said coarse composite conglomerate particles by said binder, mixing a small amount of the composite conglomerate particles with a ceramic glaze of a predetermined appearance while maintaining said conglomerate particles in a solid state, applying the resulting mixture to the ware, and firing said mixture of glaze and conglomerate particles at the maturing temperature of the ceramic glaze, said composite conglomerate particles being converted from a solid to a liquid state at a temperature below the maturing temperature of the glaze to thereby release the finely divided pigment particles, the latter contrasting in appearance with the predetermined appearance of the fired glaze, said binder volatilizing with substantially no residue at a temperature below that at which the surface of the ceramic glaze begins to fuse over.

20. Solid composite conglomerate decorative coarse pellets adapted to be introduced into a ceramic glaze prior to the firing thereof, said pellets consisting essentially of a multiplicity of finely divided pigment particles, finely divided inorganic flux, and an organic thermoplastic binder, said pigment particles and flux being substantially insoluble in said binder, said flux having a fluxing temperature lower than the maturing and firing temperature of said ceramic glaze, said thermoplastic binder being solid at a temperature below 150° F. and having the property of being transformed into a viscous liquid on heating, said multiplicity of pigment particles being distributed through and held in said composite pellets by the solid binder, said pigment being present in said pellets in an amount between 5% and 75% taken on the weight of the pellets, said binder being capable of volatilizing from the ceramic glaze into which it is adapted to be introduced below the softening temperature of the glaze.

21. Solid composite conglomerate decorative coarse pellets adapted to be introduced into a ceramic glaze prior to the firing thereof, said pellets consisting substantially of a multiplicity of finely divided pigment particles, finely divided inorganic flux, and an organic thermoplastic binder, said pigment particles and flux being substantially insoluble in said binder, said flux having a fluxing temperature lower than the maturing and firing temperature of said ceramic glaze, said thermoplastic binder being solid at a temperature below 150° F. and having the property of being transformed into a viscous liquid on heating, said multiplicity of pigment particles being distributed through and held in said composite pellets by the solid binder, said pigment being present in said pellets in an amount of about 10% taken on the weight of the pellets, said binder being capable of volatilizing from the ceramic glaze into which it is adapted to be introduced below the softening temperature of the glaze.

References Cited in the file of this patent

UNITED STATES PATENTS

| 2,318,803 | Schneider et al. | May 11, 1943 |
| 2,461,878 | Christensen et al. | Feb. 15, 1949 |
| 2,508,735 | Van Horn | May 23, 1950 |
| 2,617,740 | Morris | Nov. 11, 1952 |

OTHER REFERENCES

Enamel Bibliography and Abstracts, American Ceramic Society, Columbus 2, Ohio, 1944 (p. 178, Marbleizing Process).